Feb. 5, 1957 W. A. FICKETT 2,780,724

FREQUENCY SELECTIVE APPARATUS

Filed Jan. 14, 1955 2 Sheets-Sheet 1

WITNESSES:
E. A. McCloskey
T. H. Murray

INVENTOR
Walter A. Fickett.
BY F. E. Browder
ATTORNEY

United States Patent Office 2,780,724

Patented Feb. 5, 1957

2,780,724

FREQUENCY SELECTIVE APPARATUS

Walter A. Fickett, Severn, Md., assignor to Westinghouse Electric Corporation, East Pittsburgh, Pa., a corporation of Pennsylvania Application January 14, 1955, Serial No. 481,817

2 Claims. (Cl. 250—27)

This invention relates to devices for producing a control voltage which varies in accordance with a shift in frequency of an applied signal. It is particularly adaptable for use in systems where a frequency-shift signal is transmitted simultaneously with voice or other signals.

In addition to audio signals, telephone and other communication systems must often be provided with equipment for transmitting and receiving signals for controlling one or more auxiliary devices in some predetermined manner. For this purpose a frequency responsive control system is usually desirable since it can be made immune to amplitude changes in the signal which might be caused by audio signals, interference noise, or other factors.

In order to prevent malfunctioning of a frequency responsive control system, certain requirements must be met: First, since the control system is connected to a transmission channel for both audio and frequency shift signals, it must not operate in response to the audio signals, possible interference signals, or harmonics thereof; second, the strength of the variable frequency signals must be relatively low with respect to voice currents to prevent interference with the voice signals; and, third, the system must have a high degree of selectivity between signals which vary in frequency by a slight amount. The third requirement is particularly acute in cases where a plurality of separate intelligence signals are to be carried simultaneously over a single transmission channel. The band of frequencies which may be transmitted over the channel is limited; and, since a different frequency band must be used for each intelligence signal, a very small frequency band is available for frequency-shift control signals if any appreciable number of intelligence signals are to be simultaneously transmitted. For this reason, it is extremely desirable to have a control system which will operate in response to a very small shift in frequency.

It is a primary object of my invention to provide a frequency-shift control system having all of the requirements enumerated above.

As will become apparent from the following description, I have provided, in one embodiment of my invention, a pair of frequency selective signal channels which are connected to a signal receiving device through filtering apparatus which substantially eliminates audio signals and harmonics thereof. The desired control signal which passes through the filtering apparatus shifts between two predetermined frequencies. Each of the signal channels includes an amplifier incorporating a parallel-T band rejection feedback network. The amplifiers and their associated feedback networks constitute band-pass filters, each one presenting a low impedance to one or the other of the aforesaid predetermined frequencies while attenuating all other frequencies. The output of the amplifier in each channel is applied to a device for completely eliminating attenuated signals which may leak through the band-pass filter along with the desired signals having the predetermined frequency to which the band-pass filter of the channel is tuned. Rectifiers convert the outputs of the channels to direct-current voltages which control the bias on the grid of an electron tube. Since only one of the two predetermined frequencies will be received at any one time, the bias on the aforesaid control grid will depend upon which signal is being received. This bias regulates current flow through the vacuum tube which, in turn, controls one or more telephone utilization devices.

Further objects and features of the invention will become apparent from the following detailed description taken in connection with the accompanying drawings which form a part of this specification and in which.

Figure 3A:
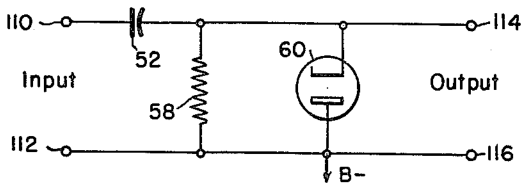
Figure 3B:
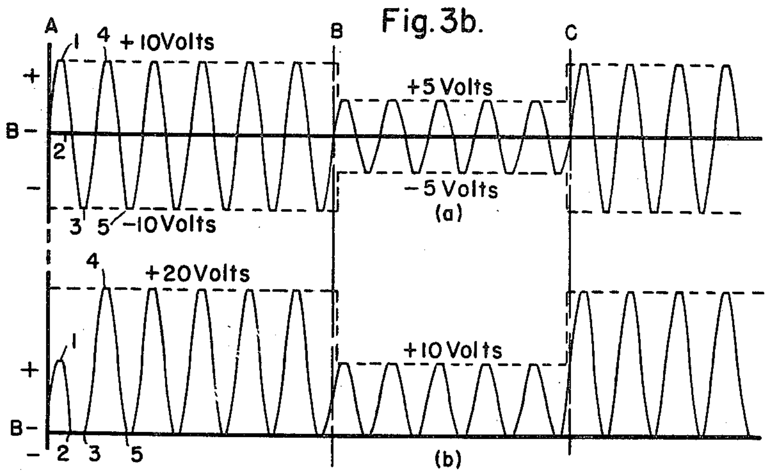
Figure 4:
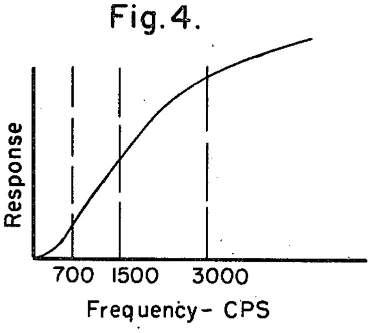

Fig. 3*a* is an equivalent circuit for the base line converters of the invention;

Fig. 3*b* is a graphical illustration of the operation of the aforesaid base line converters; and Fig. 4 is an illustration of the response curve of the audio high pass filter used in the invention.

Figure 1:
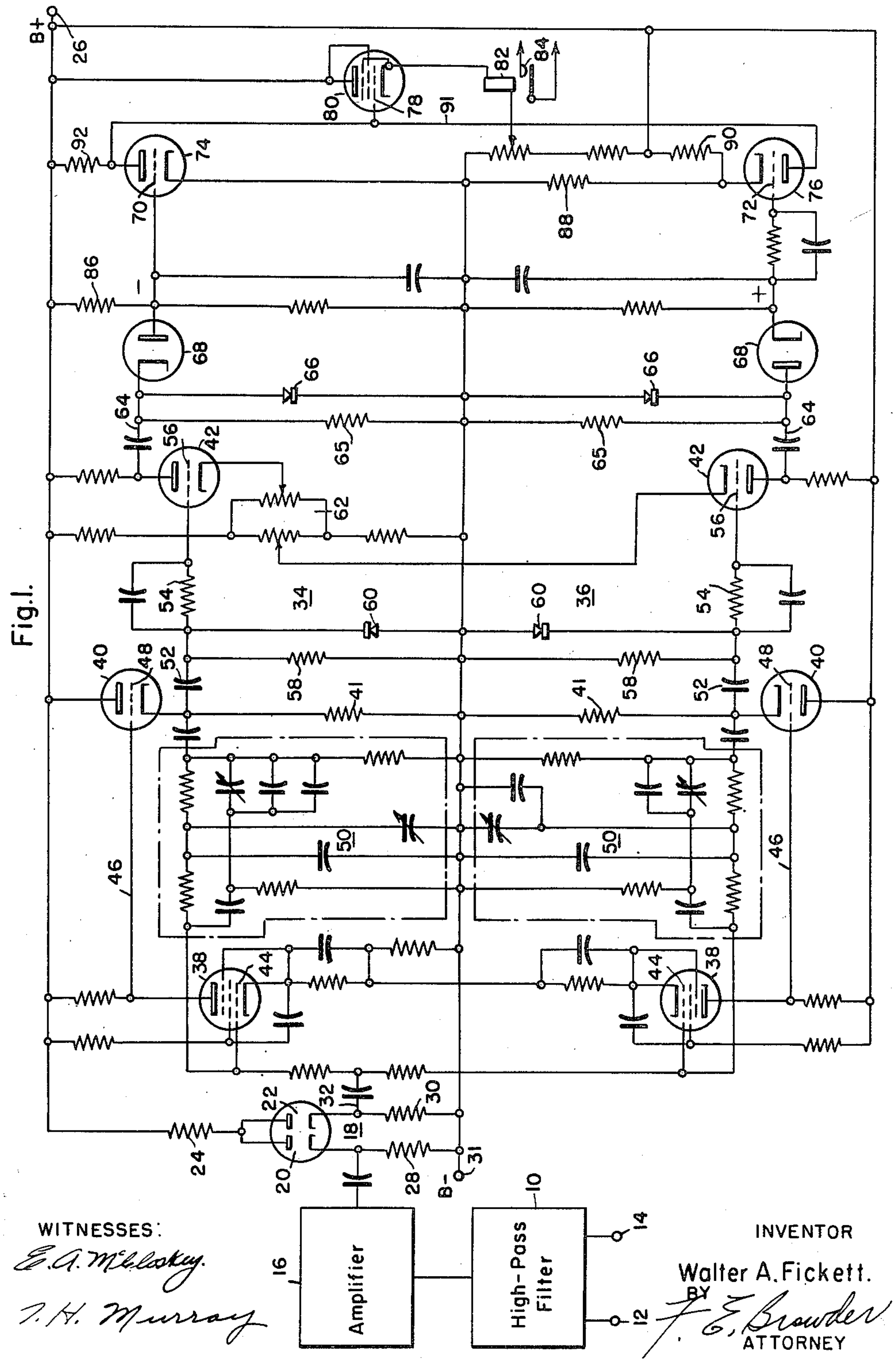
Figure 1 is a schematic illustration of the invention.

Referring to Fig. 1, a high-pass filter 10 is equipped with input terminals 12 and 14 adapted for connection to a source of combined audio signals and frequency-shift control signals. The output of filter 10 is fed through amplifier 16 to a limiter 18. The limiter comprises a pair of diodes 20 and 22 having their anodes joined, the junction being connected through resistor 24 to the positive terminal 26 of an anode voltage source, not shown. The cathodes of diodes 20 and 22 are connected through resistors 28 and 30 to the negative terminal 31 of said anode voltage source. The voltage on the anodes of diodes 20 and 22 is more positive than the voltage on their cathodes. The diodes will, therefore, conduct; and since the value of resistor 24 is much larger than the value of resistor 28 or 30, the current through the path defined by resistor 24, the parallel diodes, and resistors 28 and 30 is controlled primarily by the resistor 24. When no input signal is present, each diode carries one half of the total current through resistor 24. On the positive and negative half cycles of the applied voltage source, diodes 20 and 22 will alternately cut off. The current through resistor 24, however, remains the same. Therefore, the voltage drop across resistor 30 is doubled when diode 20 cuts off because it must now carry twice the current as it did when both diodes were conducting. When diode 22 cuts off, the voltage drop across resistor 30 disappears and point 32 assumes B-voltage level. The peak-to-peak voltage difference of the output square-wave signal is, therefore, double the voltage drop across resistor 30 when both diodes are conducting.

Figure 2:
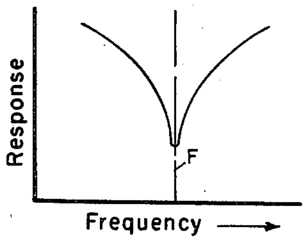
Fig. 2 is a graphical illustration of the operation of the parallel-T networks of the invention.

The voltage across resistor 30, at junction point 32, is applied to two main signal channels 34 and 36. Since the channels are substantially identical, only one will be described in detail. Corresponding elements in the respective channels are given like reference numerals. Each channel is provided with three vacuum tubes 38, 40 and 42. The signal output of limiter 18 is applied to the control grid 44 of amplifier tube 38 in each of channels 34 and 36. Suitable suppressor and screen grid arrangements are provided for tube 38, as shown. The output of tube 38 is applied through path 46 to the control grid 48 of the second vacuum tube 40. The cathode of tube 40 is connected through a parallel-T band rejection feedback network 50 (enclosed by broken lines) to the control grid 44 of tube 38. A full and complete description of parallel-T networks can be found in standard textbooks as, for example, F. Langford-Smith, "Radiotron Designers Handbook," Radio Corporation of America, 1952. The main purpose of the parallel-T network in the present invention is to completely eliminate or attenuate signals of a particular input frequency in the feedback voltage while presenting a low impedance to all other frequencies. Operation of the parallel-T network can best be understood by reference to Fig. 2. It can be seen that as the applied frequency departs in either direction from a certain predetermined frequency F the attenuation of the filter decreases rapidly and the response increases. The magnitude of the feedback voltage through network 50 will ordinarily be sufficient to render the amplification of tube 38 extremely small. When, however, the applied frequency is the predetermined frequency F to which the network 50 is tuned, the feedback voltage will be extremely small due to the attenuation effected by the network; and, therefore, amplifier 38 will produce a relatively large output voltage.

The cathode of tube 40 is equipped with a cathode load resistor 41 and is connected through condenser 52 and resistor 54 to the control grid 56 of amplifier 42. Connected in parallel between the junction of capacitor 52 and resistor 54 are a resistor 58 and rectifier 60. Capacitor 52, resistor 58 and rectifier 60 constitute a base line converter, the operation of which is illustrated in Figs. 3*a* and 3*b*.

Referring to Fig. 3*a*, the output of amplifier 40 is applied to the input terminals 110 and 112 of the base line converter. This output, illustrated as wave form (*a*) in Fig. 3*b*, comprises a continuous signal which shifts between two predetermined frequencies. The outer envelope of the signal, shown in dotted lines, takes a substantially square wave form due to the action of limiter 18 which clips the positive and negative peaks of each signal cycle. From point A to point B, the frequency of the signal is that to which the parallel-T network 50 is tuned. This signal is not attenuated in passing through amplifiers 38 and 40. The signal from point B to point C is of a frequency other than that to which the parallel-T network is tuned. It, therefore, has a reduced amplitude due to the attenuation effected by the preceding amplifier circuit. For purposes of the present illustration, it will be assumed that the peak voltage amplitude of the signal between points A and B is plus or minus 10 volts, and that between points B and C is plus or minus 5 volts.

The output wave form appearing between terminals 114 and 116 is illustrated as wave form (*b*) in Fig. 3*b*. This wave form is produced as follows: On the first half cycle of the input voltage, when terminal 110 is positive with respect to terminal 112, rectifier 60 will present an infinite impedance to current flow; and a voltage of ten volts will appear across resistor 58 (point 1 on wave forms *a* and *b*). When the input voltage is at B-potential (point 2), rectifier 60 will conduct to effectively short out resistor 58; and, therefore, the output voltage will remain at B-potential as the input voltage advances to minus 10 volts (point 3). From point 3 to point 4 on the input wave form, the voltage rises a total of 20 volts; but since point 3 is at B-potential at the beginning of the voltage rise, it will go to plus 20 volts above B-potential to reach point 4. Capacitor 52 is now charged with the instantaneous polarity shown. Because of the time constant of capacitor 52, resistor 58 and rectifier 60, it will take a time period from point 4 to point 5 before the cathode of the rectifier 60 is at B-potential. At this point, the 20 volt rise of the input wave form starts again and the cycle is repeated. It is, therefore, apparent that the base line converter serves to maintain the negative peak of an impressed signal at B-potential so that all changes in amplitude are transferred to the positive peaks. Note that the difference in positive amplitude between the attenuated and unattenuated signals is now doubled. That is, the difference in positive amplitude is changed from five volts to ten volts.

The signal which was attenuated by network 50 in passing through amplifier 38 passes from the base line converter to the grid 56 of amplifier 42 which is adjusted by means of bias control 62 to a point where the attenuated signal B—C (Fig. 3*b*) is just beyond cutoff so that it will not appear on the plate of tube 42. In the present instance, the fixed bias will be 10 volts. The unattenuated signal, however, has a peak voltage of 20 volts and will overcome the fixed bias effected by control 62, appearing greatly amplified on the plate of tube 42. Since the base line converter doubles the usable difference in amplitude between attenuated and unattenuated signals, the possible amplification of the unattenuated signal in amplifier 42 is greatly increased.

The output of tube 42 is applied through path 64 to a voltage doubler rectifier comprising rectifiers 66 and 68. In channel 34 the output of the voltage doubler rectifier will be a negative direct-current voltage, whereas the output of the rectifiers in channel 36 will be a positive direct-current voltage. These voltages are applied to the control grids 70 and 72 of amplifiers 74 and 76, respectively. The plates of amplifiers 74 and 76 are connected to the control grid 78 of an electron tube 80. Included in the plate circuit of tube 80 is a relay 82 having contacts 84 available for external circuitry. These contacts may be used to apply a ringing voltage to an indicating device or for other purposes.

Operation of the system is as follows: It will be assumed that the frequency shift control voltage applied to input terminals 12 and 14 shifts between a frequency of 3105 cycles per second and 3185 cycles per second. Also applied to input terminals 12 and 14 are audio signals which may vary in the range between 300 and 1500 cycles per second. The parallel-T feedback network in channel 34 is tuned to present a high impedance to signals having a frequency of 3185 cycles per second, whereas the corresponding feedback network in channel 36 is tuned to present a high impedance to signals of 3105 cycles per second. Therefore, channel 34 will pass a small band of signals around 3185 cycles per second and channel 36 will pass a small band around 3105 cycles per second in accordance with the description of operation of the amplifiers given above. Because of the sharp rise in attenuation of filters 50 in the range of the frequency to which they are tuned, the frequency response of amplifiers 38 will be extremely selective, thereby facilitating a very small frequency deviation between the two signals.

High pass filter 10 will attenuate most of the audio signals and prevent them from overloading the amplifier 16. Referring to the curve shown in Fig. 4, it can be seen that the response of filter 10 is best for desired signals in the range of 3,000 cycles per second. As the frequency decreases, the attenuation effected on the signal increases progressively. It is necessary that no harmonics of the audio signal in the range of 3,000 cycles per second be available in channels 34 to 36 to pass through networks 50 and cause false operation of the control system. The third harmonic of 1,000 cycles per second, for example, will be 3,000 cycles per second. However, the 1,000 cycle per second signal is sufficiently attenuated in passing through filter 10 so that its harmonics will not be of sufficient strength to actuate the alarm circuitry. The second harmonic of a high pitched audio signal in the range of 1500 cycles per second will be approximately 3,000 cycles per second. The attenuation effected on the 1500 cycle per second signal in filter 10 will not be sufficient, as shown by the response curve of Fig. 4, to prevent its second harmonic from actuating the alarm circuitry. Some means must, therefore, be provided to prevent the second harmonic of the 1500 cycle per second signal from passing into the control circuitry. For this purpose, limiter 18 is provided. It is well known that the square-wave output of a limiter will produce only odd harmonics. A discussion of the harmonic content of square-wave signals may be found in any standard textbook as, for example, F. Langford-Smith, "Radiotron Designers Handbook," Radio Corporation of America, 1952. Therefore, since only odd harmonics can be produced, the second harmonic of the 1500 cycle per second signal will not appear in the output of the limiter to actuate the alarm circuitry. Only signals having frequencies of one-third or less of the desired signal can produce interfering harmonics in the limiter. This would mean a signal somewhere in the range of 1000 cycles per second, or less. These signals, however, are effectively attenuated in filter 10 as was explained above. It can, therefore, be seen that the combination of filter 10 and limiter 18 effectively eliminates all audio signals and harmonics thereof while passing the control voltage which shifts between 3105 and 3185 cycles per second.

When a desired signal of 3105 cycles per second is impressed on the parallel control grids 44 of the respective tubes 38 in channels 34 and 36, it will pass through tube 38 in channel 36 without attenuation, while suffering considerable attenuation through tube 38 in channel 34. Since amplifier 42 cuts off the attenuated signal in channel 34 after passing through the base line converter, the voltage on grid 70 in tube 74 will remain unaffected. However, the voltage on grid 72 on tube 76 will become increasingly positive because of the amplified output from tube 42 in channel 36. Likewise, if the frequency of the control signal shifts to 3185 cycles per second the voltage on grid 72 of tube 76 will remain unchanged, whereas a negative voltage will be applied to grid 70 of tube 74.

When there is no signal input to the system, tube 74 is operating with a slight positive bias on grid 70 provided by resistor 86 and is drawing a heavy plate current which keeps its plate at a low direct-current potential. On the other hand, tube 76 has a fixed bias applied thereto by means of resistors 88 and 90 to a point well beyond cut-off; but since its plate is tied directly through path 91 to the plate of tube 74, it too is at a low direct-current potential. The grid 78 of tube 80 is also tied to the plates of tubes 74 and 76 so that it is at a low direct-current potential also.

If a signal of 3105 cycles per second is now applied to the unit, it will appear as an amplified signal on the plate of tube 42 in channel 36 but not on the plate of the corresponding tube in channel 34. The signal will be applied to the rectifier doubler in channel 36 and will appear as a positive direct-current voltage at the grid 72 of tube 76, overcoming the fixed bias afforded by resistors 88 and 90 and causing tube 76 to conduct. This additional current flowing through resistor 92 drops the grid of tube 80 to an even lower direct-current potential and effectively clamps the grid at this potential. No interference of any type can cause relay 82 to energize.

If the signal is shifted in frequency to 3185 cycles per second, the signal will disappear from the plate of tube 42 in channel 36; and the grid 72 of tube 76 will return to its former low direct-current potential, thereby removing the clamping grid voltage from the grid 78 of tube 80. At the same time, an amplified signal will appear at the plate of tube 42 in channel 34. This amplified signal will be applied to the rectifier-doubler in channel 34 and will appear as a negative direct-current voltage on the grid 70 of tube 74, thereby driving tube 74 to cut-off. Under these conditions, neither of tubes 74 nor 76 will be conducting, resistor 86 will carry no current, and the grid 78 of tube 80 will jump to a positive potential approaching that of the supply voltage. Tube 80 will, therefore, conduct to energize relay 82. It can be seen that the relay 82 will be energized whenever the frequency of the applied signal shifts to 3185 cycles per second and that the grid 78 of tube 80 will effectively block energization of relay 82 when the frequency of the applied signal shifts to 3105 cycles per second or when there is an absence of a received signal. The circuit will thus operate in response to a signal which shifts between two predetermined frequencies, 3105 and 3185 cycles per second, and will not operate in response to audio signals or harmonics thereof.

Although the invention has been described in connection with a certain specific embodiment, it will be apparent to those skilled in the art that various changes in form and arrangement of parts may be made to suit requirements without departing from the spirit and scope of the invention.

I claim as my invention:

1. Frequency selective apparatus comprising a high-pass filter designed to effectively attenuate signals below a predetermined frequency, a device for converting signals passing through said filter to square-wave form, a pair of channels into which the output of said device is fed, each of said channels including first, second and third electron discharge tubes, a control grid and a cathode for each of said tubes, a parallel-T band rejection network connecting the cathode of said second tube with the control grid of said first tube, said network being adapted to attenuate signals of a particular input frequency, a device for applying the signals appearing at the cathode of said second tube to the control grid of said third tube, said device including means for doubling the positive amplitude of signals from said second tube, means for biasing said third tube to cut off attenuated signals which pass through said first and second discharge tubes and are not of the said particular input frequency, means in each of said channels for rectifying the output of said third tube, an electron valve having a control element therein, a utilization device operable in response to current flow through said electron valve, and means for applying the rectified outputs from said channels to said control grid with opposite polarities.

2. Frequency selective apparatus comprising a filter designed to effectively attenuate signals below a predetermined frequency, a device for converting signals passing through said filter to square-wave form, a pair of channels into which the output of said device is fed, each of said channels including first and second vacuum tubes, a control grid and a cathode for each of said tubes, a parallel-T band rejection network connecting the cathode of said second tube with the control grid of said first tube, said network being adapted to attenuate signals of a particular input frequency, means in each of said channels for rectifying the outputs of said channels, and means for combining said rectified outputs with opposite polarities to produce a control voltage.

References Cited in the file of this patent

UNITED STATES PATENTS

| | | |
|---|---|---|
| 2,323,609 | Kihn | July 6, 1943 |
| 2,419,615 | Weldon | Apr. 29, 1947 |
| 2,421,054 | Chapin | May 27, 1947 |
| 2,423,229 | Crosby | July 1, 1947 |
| 2,499,484 | Friend | Mar. 7, 1950 |
| 2,709,206 | Ferguson | May 24, 1955 |

OTHER REFERENCES

McGraw-Hill, Electrical and Electronic Engineering Series, "Electron-Tube Circuits," by Seeley, pp. 133–136.